(12) United States Patent
Chou et al.

(10) Patent No.: US 6,622,192 B2
(45) Date of Patent: Sep. 16, 2003

(54) METHOD OF SHUTTING DOWN A SERVER IN SAFETY

(75) Inventors: Runner Chou, Taipei (TW); Yuh-Jine Hong, Taipei (TW)

(73) Assignee: Inventec Corporation, Taipei (TW)

(*) Notice: Subject to any disclaimer, the term of this patent is extended or adjusted under 35 U.S.C. 154(b) by 0 days.

(21) Appl. No.: 09/986,934

(22) Filed: Nov. 13, 2001

(65) Prior Publication Data

US 2003/0093602 A1 May 15, 2003

(51) Int. Cl.[7] .............................. G06F 1/00; G06F 1/26; G06F 9/00
(52) U.S. Cl. .......................... 710/260; 713/310; 714/24
(58) Field of Search .............................. 713/1, 2, 300, 713/310, 320, 321, 323, 324, 330, 340; 710/260; 714/24; 700/286; 365/226

(56) References Cited

U.S. PATENT DOCUMENTS

| | | | |
|---|---|---|---|
| 5,815,409 A | * | 9/1998 | Lee et al. |
| 6,038,671 A | * | 3/2000 | Tran et al. |
| 6,125,449 A | * | 9/2000 | Taylor et al. |
| 6,216,187 B1 | * | 4/2001 | Truong |
| 6,300,946 B1 | * | 10/2001 | Lincke et al. |

* cited by examiner

Primary Examiner—Gopal C. Ray

(57) ABSTRACT

This invention relates to a method of shutting down a server, more particularly, to a method of shutting down the server safely. The present invention uses a pre-setup normal shutting down program, which is in the operating system (OS) of the server to execute the normal shutting down steps of the sever. The present invention can avoid damages of the OS or the hardware of the server by a user accidentally pushing down the power button. The present invention can also prevent the loss of data that was saved on the server, which in turn would increase the cost of production. The present invention can further provide a method for shutting down the server quickly and prevent the user from using another machine to execute the remote shutdown.

12 Claims, 1 Drawing Sheet

METHOD OF SHUTTING DOWN A SERVER IN SAFETY

BACKGROUND OF THE INVENTION

1. Field of the Invention

This invention relates to a method of shutting down a server, more particularly, to a method of shutting down the server safely. The present invention uses a pre-setup auto-shutdown application to execute the normal shutdown steps automatically. When the signal, which is transmitted from the power button being pushed down, is detected from the present invention driver, the operating system (OS) will be called to execute the auto-shutdown application automatically to make the server shutdown in the normal steps and to maintain safety of the OS.

2. Description of the Prior Art

Computers have become indispensable tools in the present day and age. No matter if its leisure time or work, the computer plays the important role to conform the needs of the users. The computer is also the best tool to save data or information. They can be used to classify data or information systematically by using a controlled program to retrench the waste of labor and power and to increase the efficiency of the work. The computer further reduces the time spent in searching for the users needed information by quickly using the programs to the efficiency, which is paid much attention in our present society.

The OS is a translation interface between the user and the computer to make them talk with each other. In a word, the OS is an interface between the user and the computer. When the user issues commands to the computer, these commands are received by a special system program and is translated to the actions, which can be executed by the hardware. Then the hardware will execute the commands. At last, the OS must show the executable results, which are received from the hardware, on the monitor to make the user understand. The special system program is an OS.

Different operating systems have different operating modes. Before the user wants to shut down the power of the server, the user must first close the applications, which are executing within the OS. Then the user must execute the correct shutdown steps to close the OS safely. At last, the user is free to use the power button to turn off the power of the server. If the power of the server is suddenly turned off while the OS is executing the OS is forcibly shut down and it will not proceed with the correct shutdown steps. The applications in the OS will result in disorder and the data in the server will be lost. The next time the user turns on the power of the server to start up the OS, the OS will not operate in a normal state and will cause trouble for the user.

There are a lot of different kinds of the operating systems and different kinds of servers are chosen following the needs of different enterprises. The different operating systems must be collocated to the suitable servers to bring efficiency into full play of the operating systems. The usual servers, that use the Windows operating system, at present support a server power controlling program, which is the advanced configuration & power interface (ACPI). The ACPI can connect the users with the OS by using the Windows interface to transmit the users' command. When the user pushes down the power button of the server, the OS should show the actions in suspend or shutdown by using the ACPI. When the user pushes down the power button of the server and keeps pushing the power button for four seconds, the chipset hardware circuit of the server will stop the power of the server forcedly to shut down the server. When the user breaks down the actions of the OS provisionally, the data, which is in the dynamic random access memory (DRAM) and the register, will be saved to make the server restore the former actions quickly in the condition that the server must be restored. This condition is called the suspend situation. Therefore, when the users want to shut down the server by using the power switch, the operating system, which comprises the ACPI, will not cause damages in the operating system and the hardware of the server because of the power switch being pushed suddenly.

In order to the thoughts of the products, the Linux operating system, which is used at present, does not comprise the APCI in the supporting scope. In this kind of OS, which does not support the ACPI, the users will not shut down the server by pushing down the power button directly in safety. The users must stop the applications, which are executing in the OS, at first. Then the users must type a shutdown command to shut down the server in safety. This shutdown command is "shutdown -h now". When the Linux Os receives this command, it can execute the normal shutdown steps. If the user pushes down the power button of the server directly, the power of the server will be cut off instantly and will cause an abnormal shutdown condition of the server. This abnormal shutdown condition will easily damage the files of the OS and will cause the server to recheck the hard discs when the server is restarted the next time which will extend the start up time when restarting the server. This abnormal shutdown condition will also damage the data structure of the OS and the OS can not be entered when the server is restarted the next time. This abnormal shutdown condition will further damage the partial hardware of the server and loose the data, which was saved in the server.

Following the different needs of the business, some servers, which use the Linux OS, don't support the ACPI and don't connect with the keyboards and monitors. Therefore, this kind of server can't provide the users the OS command to shut down the server following the normal steps by the keyboard. This kind of server also prevents the user from monitoring the situation of OS from the monitor. If the user want to replace the devices of the server or to service the server, the user must push down the power button of the server or connect the keyboard and the monitor to the server to shut down the server. This condition will increase the chance in damaging the OS and will decrease the work efficiency of the user.

SUMMARY OF THE INVENTION

In accordance with the background of the above-mentioned invention, the traditional shutting down method can't shut down the server safely and can't preserve the completeness of the OS, which is used in the server. The main objective of the invention is to shut down the server safely by using a normal shutdown application, which is pre-installed in the OS, to shut down the server when the driver, which is provided by the present invention, detects the signal, which is transmitted from the power button of the server to be pushed down, and calls on the OS to execute the normal shutdown application automatically.

The second objective of this invention is to preserve the safety of the OS by using a normal shutdown application, which is pre-installed in the OS, to shut down the server when the driver, which is provided by the present invention, detects the signal, which is transmitted from the power button of the server to be pushed down, and calls the OS to execute the normal shutdown application automatically.

The third objective of this invention is to preserve the safety of the data, which was saved in the server, by using a normal shutdown application, which is pre-installed in the OS, to shut down the server when the driver, which is provided by the present invention, detects the signal, which is transmitted from the power button of the server to be pushed down, and calls on the OS to execute the normal shutdown application automatically.

The fourth objective of this invention is to increase the efficiency of the server by using a normal shutdown application, which is pre-installed in the OS, to shut down the server when the driver, which is provided by the present invention, detects the signal, which is transmitted from the power button of the server to be pushed down, and calls on the OS to execute the normal shutdown application automatically.

The further objective of this invention is to extend the life of the server by using a normal shutdown application, which is pre-installed in the OS, to shut down the server when the driver, which is provided by the present invention, detects the signal, which is transmitted from the power button of the server to be pushed down, and calls on the OS to execute the normal shutdown application automatically.

In according to the foregoing objectives, the present invention provides a method to shut down the server safely and to preserve the safety of the OS by using a normal shutdown application, which is pre-installed in the OS, to shut down the server when the driver, which is provided by the present invention, detects the signal, which is transmitted from the power button of the server to be pushed down, and calls on the OS to execute the normal shutdown application automatically. The present invention can also preserve the safety of the data, which was saved in the server, and increase the efficiency of the server. The present invention can further extend the life of the server.

BRIEF DESCRIPTION OF THE DRAWINGS

In the accompanying drawing forming a material part of this description, there is shown.

DESCRIPTION OF THE PREFERRED EMBODIMENT

Figure 1:
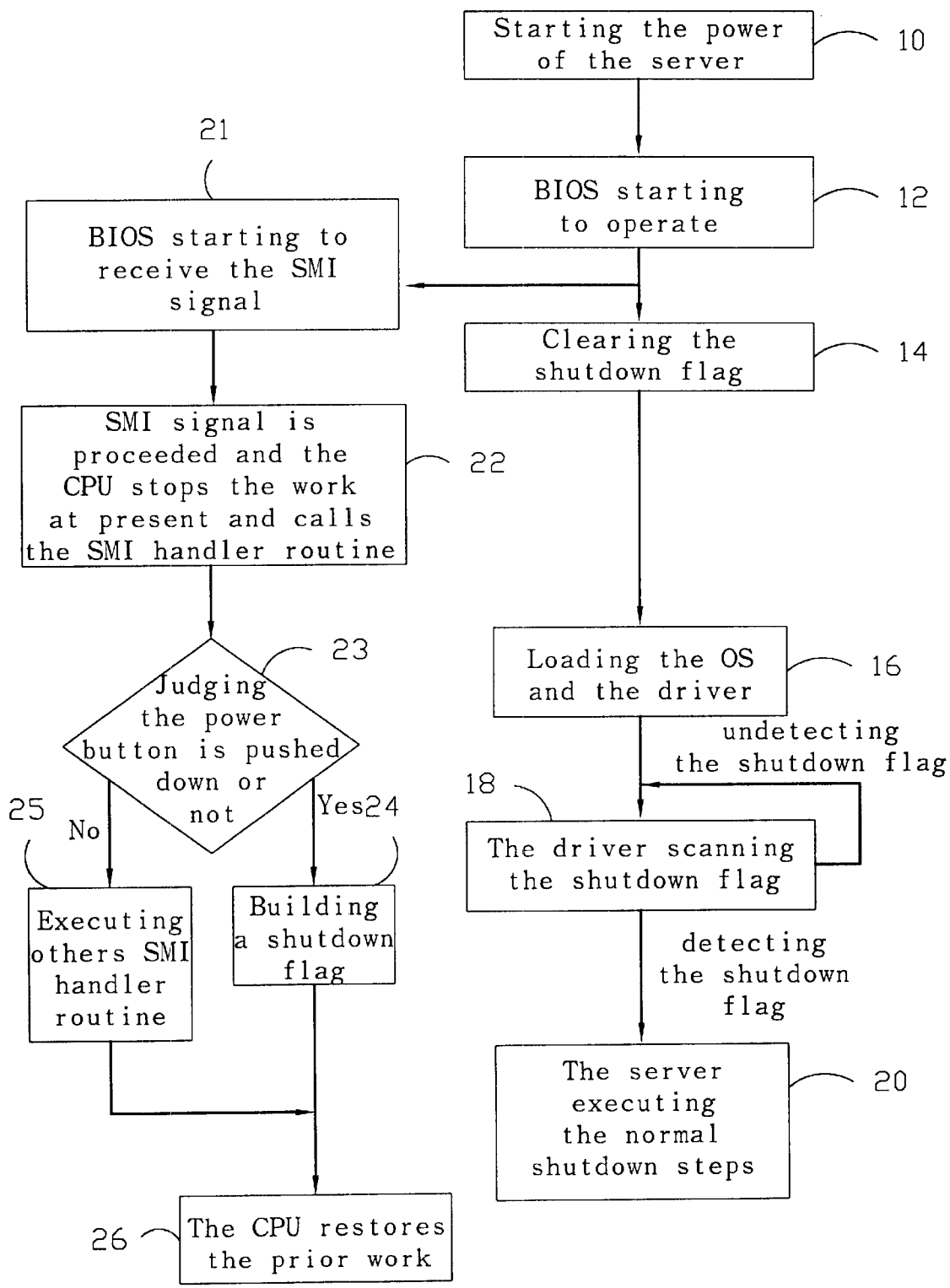
FIG. 1 shows a flowchart in using the present invention to shut down the server in safety.

The foregoing aspects and many of the attendant advantages of this invention will become more readily appreciated as the same becomes better understood by reference to the following detailed description, when taken in conjunction with the accompanying drawings, wherein:

Following the advancements of the science and technology, the dependence of the user upon the server has become higher and higher. Therefore, the data, which was saved in the server, is more important. If the power button of the server is pushed down in the condition that the user still has not typed the shutdown command by the keyboard, the power of the server will be cut off to affect the program structure of the OS or damage the data, which was saved in the server. This abnormal shutdown condition will cause the company to have great lost. Therefore, the shutdown method in safety of the present invention must be used to make the server, whose OS does not support the ACPI, can be shut down in safety.

The Linux OS, which does not support the ACPI, is mostly used with two kinds of servers. One uses a flash disk to save data and the other uses the hard disk to save data. Although the OS in the server, which uses the flash disk, does not support the ACPI, the data which was saved in the flash disk, will not be lost and the hardware of the server will not be damaged when the power of the server is suddenly shut down. When the power of the server, which uses the hard disk, is suddenly shut down, the data which was on the hard disk will be damaged or will cause a disordered condition. If the user using the hard disk wants to start the server, the OS of the server will spend time to check and correct the structural damages, which were caused by the abnormal shutdown actions of the server, of the OS. If the power of the server is suddenly shut down the tracks of the hard disk will be damaged and the data which was being read or saved will be lost or a reduction in the life of the hard disk will result. The following embodiment uses the present invention method in the server, that uses the hard disk, and the OS of this kind of server does not support the ACPI. This embodiment will not limit the scope of the present invention.

In the general server, that uses the hard disk, if the OS of the server, which uses the Linux OS that does not support the ACPI, the users must type a command with the keyboard to the OS to shut down the OS safely before the power of the server is shut down. Then the power button of the server can be pushed down to shut down the power of the server. The command is "shutdown -h now" in general. But following the advancements in the science and the technology, there are no keyboards and monitors equipped with servers. If the servers need to be maintained or be replaced the devices in the shutdown condition, the users must connect the keyboards and the monitors with the servers additionally or connect the servers with another servers, which has a keyboard and a monitor, to import the shutdown command. It is a troubling process and the user will spend a lot of time. If the power button of the server is pushed down directly, it will reduce the time in shutdown. But this action will affect the lifetime of the hard disk and will cause the data, which were saved in the server, to be lost or damaged. Therefore, the present invention must be used to shut down the serversafely.

The present invention installs a driver, which is provided from the present invention, and an auto-shutdown application in the OS first. The driver can call on the OS to execute the auto-shutdown application automatically. When the user pushes down the power button of the server to shut down the server. The power button of the server will transmit a system management interrupt (SMI) signal to the central processing unit (CPU) by the chipset. When the CPU receives the SMI signal, the CPU will execute the system management interrupt handler routine, which is in the basic input/output system (BIOS) immediately. When the BIOS of the server receives the shutdown signal, the system management interrupt service code will build a shutdown flag and will save this shutdown flag into a usable memory. The shutdown flag is a kind of signal. In the embodiment, the shutdown flag is used to judge when the power button to be pushed down or not. The shutdown flag is saved in the complementary metal oxide semiconductor (CMOS) random access memory (RAM) of the server in the embodiment but this method will not limit the scope of the present invention. The objective of building a shutdown flag in the fixed address of the CMOS RAM is to notify the driver that a shutdown signal is produced.

The CMOS RAM is usually used to read and save the signals in the BIOS. The CMOS RAM usually uses "0" and "1" to express the modes of the signal. A designer can set "0" to be a normal flag and set "1" to be a shutdown flag in a fixed address of the CMOS RAM to make the driver of the present invention easily judge the kind of signals.

After the driver of the present invention is installed in the OS, the driver will scan the fixed address, which is used to save the shutdown flag, of the CMOS RAM. The driver of the present invention will scan the fixed address, which is used to save the shutdown flag, of the CMOS RAM once a second. But following the needs of the users, the interval time of the scanning will be increased or decreased. When the driver detects the shutdown flag building in the CMOS RAM, the driver will call the OS to execute the auto-shutdown application and make the OS close in the normal condition. At last, the power of the server can just be closed. The normal shutdown steps can prevent the data structure of the OS to be damaged and can prevent the tracks of the hard disk to cause the damaged condition. When the OS is started the next time, the BIOS of the server will clear the shutdown flag automatically and will restore the address to become the normal flag. Then the OS of the server can execute and proceed with the normal steps.

Referring to FIG. 1, this shows a flowchart in using the present invention to shut down the server safely. At first, the power button is pushed down to open the power of the server 10. Then the BIOS of the server is executed 12. The BIOS starts to initiate the system management mode (SMM) and starts to enable the SMI signal, which is transmitted from the chipset to the CPU. The BIOS also starts to provide the system management interrupt handler routine, which is called by the CPU 21. Then the BIOS will clear the shutdown flag, which is saved in the COMS RAM, before the OS is loaded 14. Then the OS and the BIOS will proceed at the same time. On one hand, if the system provides a SMI signal, the CPU will stop the work at present and will execute the system management interrupt handler routine, which is provided by the BIOS 22. The routine will check the source of the interruption and will judge if the power button is to be pushed down or not 23. If the source of the interruption is the power button being pushed down, a shutdown flag will be built in the fixed address of the CMOS RAM in the server 24. If the routine judge the power button not to be pushed down, the others SMI signal service will be executed 25. After the routine finishing the work, the CPU just restore to the prior work at once 26. On the other hand, the OS starts to be loaded and the driver that is used to scan the shutdown flag of the present invention is loaded 16. After loading the Os and the driver, the driver will scan the shutdown flag, which is located in the fixed address of the CMOS RAM. If the driver detects the shutdown flag, which is in the CMOS RAM, the driver calls the auto-shutdown application, which is installed in the OS to proceed with the normal shutdown steps. Then the power of the server is shut down automatically 20.

In accordance with the present invention, the present invention provides a method to shut down the server safely and to preserve the safety of the OS by using a normal shutdown application, which is pre-installed in the OS, to shut down the server when the driver, which is provided by the present invention, detects the signal, which is transmitted from the power button of the server to be pushed down, and calls on the OS to execute the normal shutdown application automatically. The present invention can also preserve the safety of the data, which was saved on the server, and increase the efficiency of the server. The present invention can further extend the life of the server.

Although specific embodiments have been illustrated and described, it will be obvious to those skilled in the art that various modifications may be made without departing from what is intended to be limited solely by the appended claims.

What is claimed is:

1. A method of shutting down a server in safety, wherein said method comprises:
    producing a system management interrupt signal by a power button of said server;
    transforming said system management interrupt signal to a shutdown flag and saving said shutdown flag in a memory device;
    using a driver to scan said shutdown flag; and
    using said driver to call an operating system without an advanced configuration and power interface (ACPI) to execute an auto-shutdown application.

2. The method according to claim 1, wherein said server comprises a CMOS RAM.

3. The method according to claim 1, wherein said memory device is a CMOS RAM.

4. The method according to claim 1, wherein said operating system is a linux operating system.

5. A method of shutting down a server in safety, wherein said method comprises:
    installing a driver and an auto-shutdown application in an operating system without an advanced configuration and power interface (ACPI) of said server when said server is in an operating condition, wherein said driver can scan a shutdown flag of a memory device and can call said operating system to execute an auto-shutdown application automatically;
    pushing down a power button of said server to produce a system management interrupt signal; and
    transforming said system management interrupt signal to a shutdown flag and saving said shutdown flag in said memory device.

6. The method according to claim 5, wherein said server comprises a CMOS RAM.

7. The method according to claim 5, wherein said memory device is a CMOS RAM.

8. The method according to claim 5, wherein said operating system is a linux operating system.

9. The method according to claim 5, wherein said server comprises a hard disk.

10. A method of shutting down a server in safety, wherein said method comprises:
    pushing down a power button of said server to open a power of said server and to clear a shutdown flag, which is saved in a CMOS RAM, wherein said server comprises a hard disk;
    installing a driver and an auto-shutdown application in a linux operating system of said server, wherein said driver can call said linux operating system to execute an auto-shutdown application automatically;
    pushing down said power button of said server to produce a system management interrupt signal;
    transforming said system management interrupt signal to said shutdown flag and saving said shutdown flag in said CMOS RAM;
    using said driver scanning said shutdown flag; and
    calling said linux operating system from said driver to execute said auto-shutdown application to shut said server.

11. A method of shutting down a server in safety, wherein said method comprises:
    producing a system management interrupt signal by a power button of said server;
    transforming said system management interrupt signal to a shutdown flag and saving said shutdown flag in a memory device;

using a driver to scan said shutdown flag; and using said driver to call a Linux operation system to execute an auto-shutdown application.

12. A method of shutting down a server in safety, wherein said method comprises:

installing a driver and an auto-shutdown application in a Linux operating system of said server when said server is in an operating condition, wherein said driver can scan a shutdown flag of a memory device and can call said Linux operating system to execute an auto-shutdown application automatically;

pushing down a power button of said server to produce a system management interrupt signal; and transforming said system management interrupt signal to a shutdown flag and saving said shutdown flag in said memory device.

* * * * *